US011391996B2

(12) United States Patent
Tsukane et al.

(10) Patent No.: US 11,391,996 B2
(45) Date of Patent: Jul. 19, 2022

(54) DISPLAY DEVICE (71) Applicant: Japan Display Inc., Tokyo (JP)

(72) Inventors: Midori Tsukane, Tokyo (JP); Toshiyuki Higano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/313,211

(22) Filed: May 6, 2021

(65) Prior Publication Data
US 2021/0255493 A1 Aug. 19, 2021

Related U.S. Application Data (63) Continuation of application No. PCT/JP2019/034026, filed on Aug. 29, 2019.

(30) Foreign Application Priority Data

Nov. 26, 2018 (JP) .............................. JP2018-220288

(51) Int. Cl.
*G02F 1/1339* (2006.01)
*G02F 1/1335* (2006.01)
*G02F 1/1343* (2006.01)

(52) U.S. Cl.
CPC ...... *G02F 1/1339* (2013.01); *G02F 1/133512* (2013.01); *G02F 1/133514* (2013.01); *G02F 1/134309* (2013.01)

(58) Field of Classification Search
None
See application file for complete search history.

(56) References Cited

U.S. PATENT DOCUMENTS 6,022,646 A * 2/2000 Kim ................. G02F 1/133512
430/7
6,175,397 B1 * 1/2001 Inoue .................... G02F 1/1334
349/86
2002/0167634 A1 * 11/2002 Watanabe ......... G02F 1/133512
349/153

(Continued)

FOREIGN PATENT DOCUMENTS

CN 106502006 A * 3/2017
CN 108828827 A * 11/2018

(Continued)

OTHER PUBLICATIONS

International Search Report dated Oct. 8, 2019 in PCT/JP2019/034026 filed on Aug. 29, 2019, 2 pages.

*Primary Examiner* — Shan Liu
(74) *Attorney, Agent, or Firm* — Oblon, McClelland, Maier & Neustadt, L.L.P.

(57) ABSTRACT

According to one embodiment, a display device includes a first substrate including a first transparent substrate and a pixel electrode, a second substrate including a second transparent substrate and a common electrode opposed to the pixel electrode, a liquid crystal layer located between the first substrate and the second substrate and containing a polymer and liquid crystal molecules, a sealant bonding the first substrate and the second substrate and sealing in the liquid crystal layer, and a light-emitting element. The second transparent substrate comprises a side surface opposed to the light-emitting element. A color of the sealant is black, yellow or red.

20 Claims, 9 Drawing Sheets (56) References Cited

U.S. PATENT DOCUMENTS

| | | | |
|---|---|---|---|
| 2002/0180908 A1* | 12/2002 | Ariyoshi | G02F 1/133615 |
| | | | 349/113 |
| 2007/0206137 A1 | 9/2007 | Akiyama | |
| 2008/0252838 A1* | 10/2008 | Chan | G02F 1/1339 |
| | | | 349/153 |
| 2012/0033150 A1* | 2/2012 | Kim | G02F 1/1341 |
| | | | 349/43 |
| 2013/0271690 A1* | 10/2013 | Matsukizono | H01L 29/7869 |
| | | | 349/46 |
| 2015/0109763 A1* | 4/2015 | Shinkai | G02F 1/1336 |
| | | | 362/97.2 |
| 2016/0077376 A1* | 3/2016 | Lee | G02F 1/1339 |
| | | | 349/106 |
| 2019/0310510 A1* | 10/2019 | Chien | G02F 1/133512 |

FOREIGN PATENT DOCUMENTS

| | | | |
|---|---|---|---|
| JP | 09-185082 A | | 7/1997 |
| JP | 10-062812 A | | 3/1998 |
| JP | 11-109383 A | | 4/1999 |
| JP | 11-295743 A | | 10/1999 |
| JP | 2006-058331 A | | 3/2006 |
| JP | 2006-099027 A | | 4/2006 |
| JP | 2007-094254 A | | 4/2007 |
| JP | 2007094254 A | * | 4/2007 |
| JP | 2012-032506 A | | 2/2012 |
| JP | 2014-114358 A | | 6/2014 |

\* cited by examiner

DISPLAY DEVICE

CROSS-REFERENCE TO RELATED APPLICATIONS

This application is a Continuation Application of PCT Application No. PCT/JP2019/034026, filed Aug. 29, 2019 and based upon and claiming the benefit of priority from Japanese Patent Application No. 2018-220288, filed Nov. 26, 2018, the entire contents of all of which are incorporated herein by reference.

FIELD

Embodiments described herein relate generally to a display device.

BACKGROUND

In general, a liquid crystal display device holds a liquid crystal layer between a pair of substrates. A sealant bonds the pair of substrates and seals in the liquid crystal layer. In the liquid crystal display device, particularly, in the transmissive liquid crystal display device which displays an image by selectively transmitting illumination light from a backlight unit, it is proposed to apply a black sealant to suppress light leakage from the sealant.

DETAILED DESCRIPTION

In general, according to one embodiment, there is provided a display device comprising: a first substrate comprising a first transparent substrate and a pixel electrode; a second substrate comprising a second transparent substrate and a common electrode opposed to the pixel electrode; a liquid crystal layer located between the first substrate and the second substrate and containing a polymer and liquid crystal molecules; a sealant bonding the first substrate and the second substrate and sealing in the liquid crystal layer; and a light-emitting element. The second transparent substrate comprises a side surface opposed to the light-emitting element. A color of the sealant is black, yellow or red.

The present embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference signs, and detailed descriptions thereof which are considered redundant are omitted unless necessary.

Figure 1:
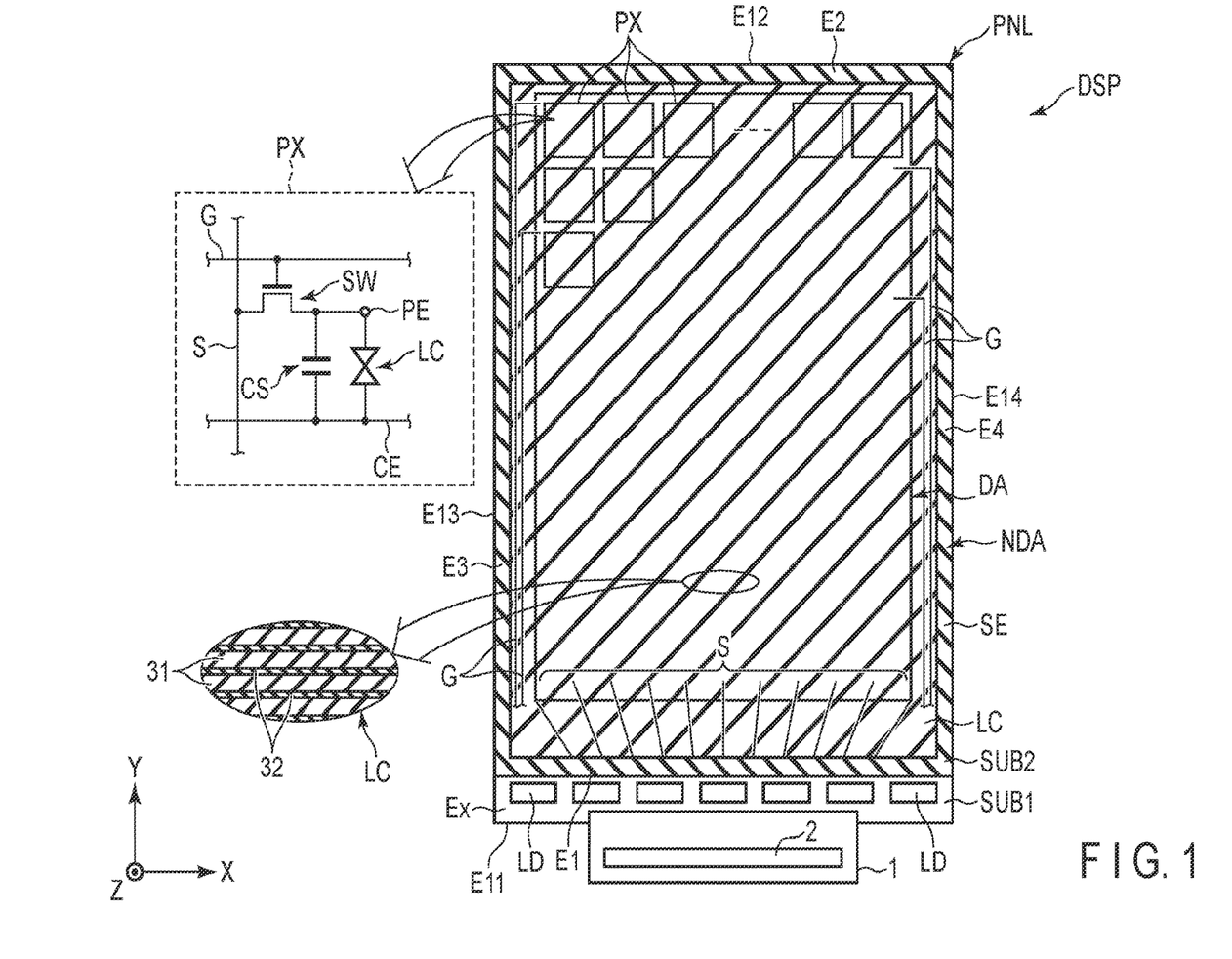
FIG. 1 is a plan view showing a configuration example of a display device DSP of the present embodiment.

FIG. 1 is a plan view showing a configuration example of a display device DSP of the present embodiment. In one example, a first direction X, a second direction Y and a third direction Z are orthogonal to one another. However, they may intersect one another at an angle other than 90 degrees. The first direction X and the second direction Y correspond to directions parallel to the main surface of a substrate constituting the display device DSP, and the third direction Z corresponds to the thickness direction of the display device DSP. It is assumed that an observation position for observing the display device DSP is located on the tip side of an arrow indicating the third direction Z, and viewing from this observation position toward an X-Y plane defined by the first direction X and the second direction Y is referred to as planar view.

In the present embodiment, a liquid crystal display device employing a polymer dispersed liquid crystal will be described as an example of the display device DSP. The display device DSP comprises a display panel PNL, a wiring board 1, an IC chip 2 and a light-emitting element LD.

The display panel PNL has a pair of short sides E11 and E12 extending along the first direction X, and a pair of long sides E13 and E14 extending along the second direction Y. The display panel PNL comprises a first substrate SUB1, a second substrate SUB2, a liquid crystal layer LC and a sealant SE. The first substrate SUB1 and the second substrate SUB2 are formed in a flat plate shape parallel to the X-Y plane. The first substrate SUB1 and the second substrate SUB2 overlap each other in planar view. The first substrate SUB1 and the second substrate SUB2 are bonded together by the sealant SE. The sealant SE is formed in, for example, a loop shape, and does not include a liquid crystal injection port or a filling material. The liquid crystal layer LC is held between the first substrate SUB1 and the second substrate SUB2, and is sealed in by the sealant SE. In FIG. 1, the liquid crystal layer LC and the sealant SE are shown by different diagonal lines.

In one example, the sealant SE is formed in a rectangular frame shape surrounding the liquid crystal layer LC, and has a portion (first portion) E1 and a portion (second portion) E2 extending along the first direction X and a portion (third portion) E3 and a portion (fourth portion) E4 extending along the second direction Y. The portions E1 to E4 are in contact with the liquid crystal layer LC. Note that the sealant SE may be formed in a circular frame shape or may be formed in another shape.

As enlarged and schematically shown in FIG. 1, the liquid crystal layer LC comprises a polymer dispersed liquid crystal containing a polymer 31 and liquid crystal molecules 32. In one example, the polymer 31 is a liquid crystal polymer. The polymer 31 is formed in a streak shape extending along the first direction X. The liquid crystal molecules 32 are dispersed in the gaps of the polymer 31, and each are aligned such that the major axis thereof extends along the first direction X. The polymer 31 and the liquid crystal molecule 32 each have optical anisotropy or refractive anisotropy. The responsiveness to an electric field of the polymer 31 is lower than the responsiveness to an electric field of the liquid crystal molecule 32.

In one example, the alignment direction of the polymer 31 hardly changes with or without an electric field. On the other hand, the alignment direction of the liquid crystal molecule 32 changes according to an electric field in a state where a high voltage of greater than or equal to a threshold value is applied to the liquid crystal layer LC. In a state where no voltage is applied to the liquid crystal layer LC, the optical axis of the polymer 31 and the optical axis of the liquid crystal molecule 32 are parallel to each other, and light entering the liquid crystal layer LC is transmitted almost without being scattered in the liquid crystal layer LC (a transparent state). In a state where a voltage is applied to the liquid crystal layer LC, the optical axis of the polymer 31 and the optical axis of the liquid crystal molecule 32 intersect each other, and light entering the liquid crystal layer LC is scattered in the liquid crystal layer LC (a scattering state).

The display panel PNL comprises a display portion DA in which an image is displayed, and a frame-shaped non-display portion NDA which surrounds the display portion DA. The sealant SE is located in the non-display portion NDA. The display portion DA comprises pixels PX arranged in a matrix in the first direction X and the second direction Y.

As shown enlarged in FIG. 1, each pixel PX comprises a switching element SW, a pixel electrode PE, a common electrode CE, a liquid crystal layer LC and the like. The switching element SW is composed of, for example, a thin-film transistor (TFT), and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The common electrode CE is disposed common to the pixel electrodes PE. The liquid crystal layer LC (specifically, the liquid crystal molecules 32) is driven by an electric field produced between the pixel electrode PE and the common electrode CE. A capacitance CS is formed, for example, between an electrode having the same potential as the common electrode CE and an electrode having the same potential as the pixel electrode PE.

As will be described later, the scanning line G, the signal line S, the switching element SW and the pixel electrode PE are disposed in the first substrate SUB1, and the common electrode CE is disposed in the second substrate SUB2. In the first substrate SUB1, the scanning line G extends between the display portion DA and the portion E3 of the sealant SE and between the display portion DA and the portion E4 of the sealant SE, and is electrically connected to the wiring board 1 or the IC chip 2. The signal line S extends between the display portion DA and the portion E1 of the sealant SE, and is electrically connected to the wiring board 1 or the IC chip 2.

The wiring board 1 is electrically connected to an extension portion Ex of the first substrate SUB1. The wiring board 1 is a foldable flexible printed circuit board. The IC chip 2 is electrically connected to the wiring board 1. The IC chip 2 incorporates, for example, a display driver which outputs a signal necessary for displaying an image. Note that the IC chip 2 may be electrically connected to the extension portion Ex.

The light-emitting element LD overlaps the extension portion Ex. The plurality of light-emitting elements LD are arranged at intervals along the first direction X.

Figure 2:
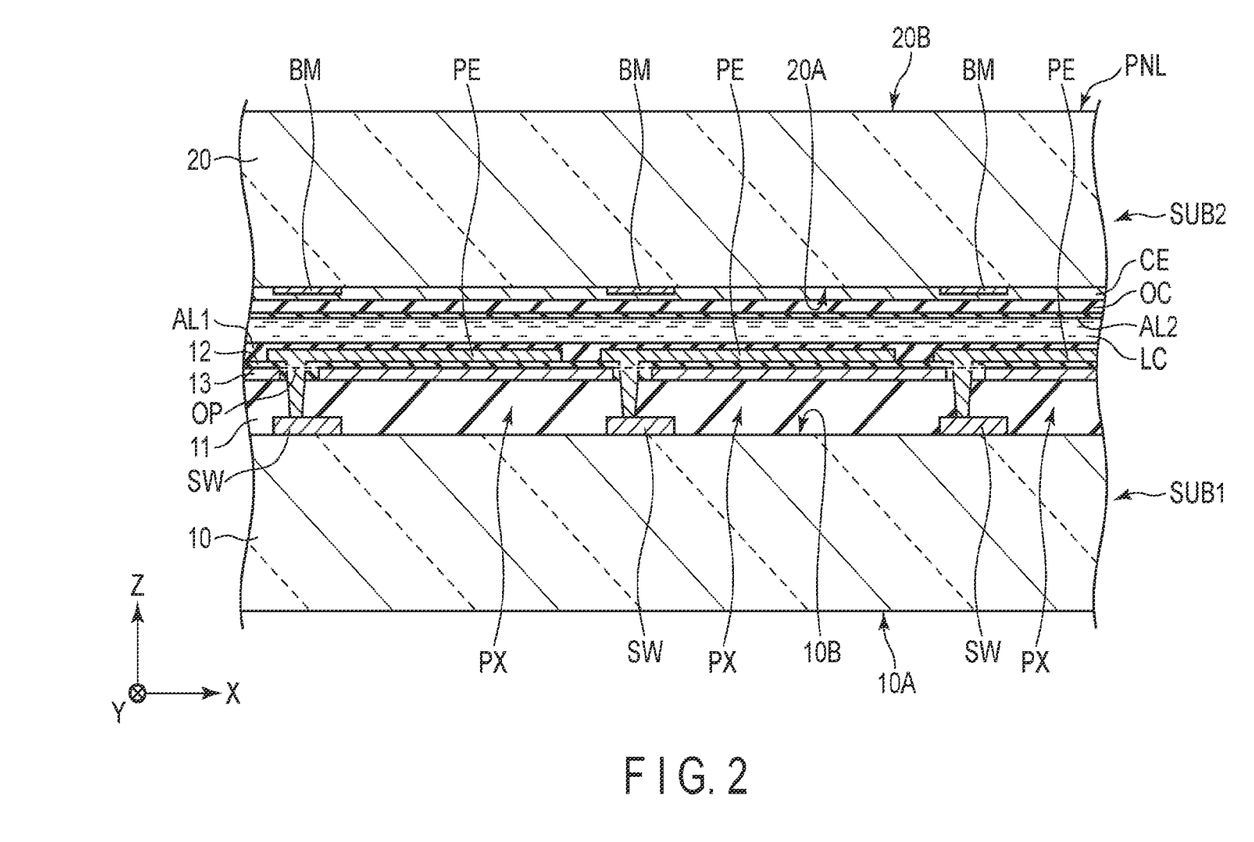
FIG. 2 is a cross-sectional view showing a configuration example of a display panel PNL shown in FIG. 1.

FIG. 2 is a cross-sectional view showing a configuration example of the display panel PNL shown in FIG. 1.

The first substrate SUB1 comprises a transparent substrate 10, insulating films 11 and 12, a capacitance electrode 13, the switching element SW, the pixel electrode PE and an alignment film AL1. The transparent substrate 10 comprises a main surface (lower surface) 10A and a main surface (upper surface) 10B on the opposite side to the main surface 10A. The switching element SW is disposed on the main surface 10B side. The insulating film 11 covers the switching element SW. Note that, although the scanning line G and the signal line S shown in FIG. 1 are located between the transparent substrate 10 and the insulating film 11, the illustrations thereof are omitted here. The capacitance electrode 13 is located between the insulating films 11 and 12. The pixel electrode PE is disposed for each pixel PX between the insulating film 12 and the alignment film AL1. The pixel electrode PE is electrically connected to the switching element SW via an opening OP of the capacitance electrode 13. The pixel electrode PE overlaps the capacitance electrode 13 across the insulating film 12, and forms the capacitance CS of the pixel PX. The alignment film AL1 covers the pixel electrode PE.

The second substrate SUB2 comprises a transparent substrate 20, a light-shielding layer BM, the common electrode CE, an overcoat layer OC and an alignment film AL2. The transparent substrate 20 comprises a main surface (lower surface) 20A and a main surface (upper surface) 20B on the opposite side to the main surface 20A. The main surface 20A of the transparent substrate 20 faces the main surface 10B of the transparent substrate 10. The light-shielding layer BM and the common electrode CE are disposed on the main surface 20A side. The light-shielding layer BM is located, for example, directly above the switching element SW and directly above the scanning line G and the signal line S which are not shown in the drawing. The common electrode CE is disposed over the pixels PX, and is opposed to the pixel electrodes PE in the third direction Z. In addition, the common electrode CE covers the light-shielding layer BM. The common electrode CE is electrically connected to the capacitance electrode 13, and has the same potential as the capacitance electrode 13. The overcoat layer OC covers the common electrode CE. The alignment film AL2 covers the overcoat layer OC.

The liquid crystal layer LC is located between the first substrate SUB1 and the second substrate SUB2, and is in contact with the alignment films AL1 and AL2.

The transparent substrates 10 and 20 each are an insulating substrate such as a glass substrate or a plastic substrate. The insulating film 11 is formed of a transparent insulating material such as silicon oxide, silicon nitride, silicon oxynitride or acrylic resin. In one example, the insulating film 11 includes an inorganic insulating film and an organic insulating film. The insulating film 12 is an inorganic insulating film of silicon nitride or the like. The capacitance electrode 13, the pixel electrode PE and the common electrode CE each are a transparent electrode formed of a transparent conductive material such as indium tin oxide (ITO) or indium zinc oxide (IZO). The light-shielding layer BM comprises, for example, a conductive layer having a lower resistance than the common electrode CE. In one example, the light-shielding layer BM is formed of a non-transparent metal material such as molybdenum, aluminum, tungsten, titanium or silver. The common electrode CE is in contact with the light-shielding layer BM, and is therefore electrically connected to the light-shielding layer BM. Accordingly, the common electrode CE is made less resistive. The alignment films AL1 and AL2 each are a horizontal alignment film having an alignment regulating force substantially parallel to the X-Y plane. In one example, the alignment films AL1 and AL2 are subjected to alignment treatment along the first direction X. Note that the alignment treatment may be rubbing treatment or may be photo-alignment treatment.

Figure 3:
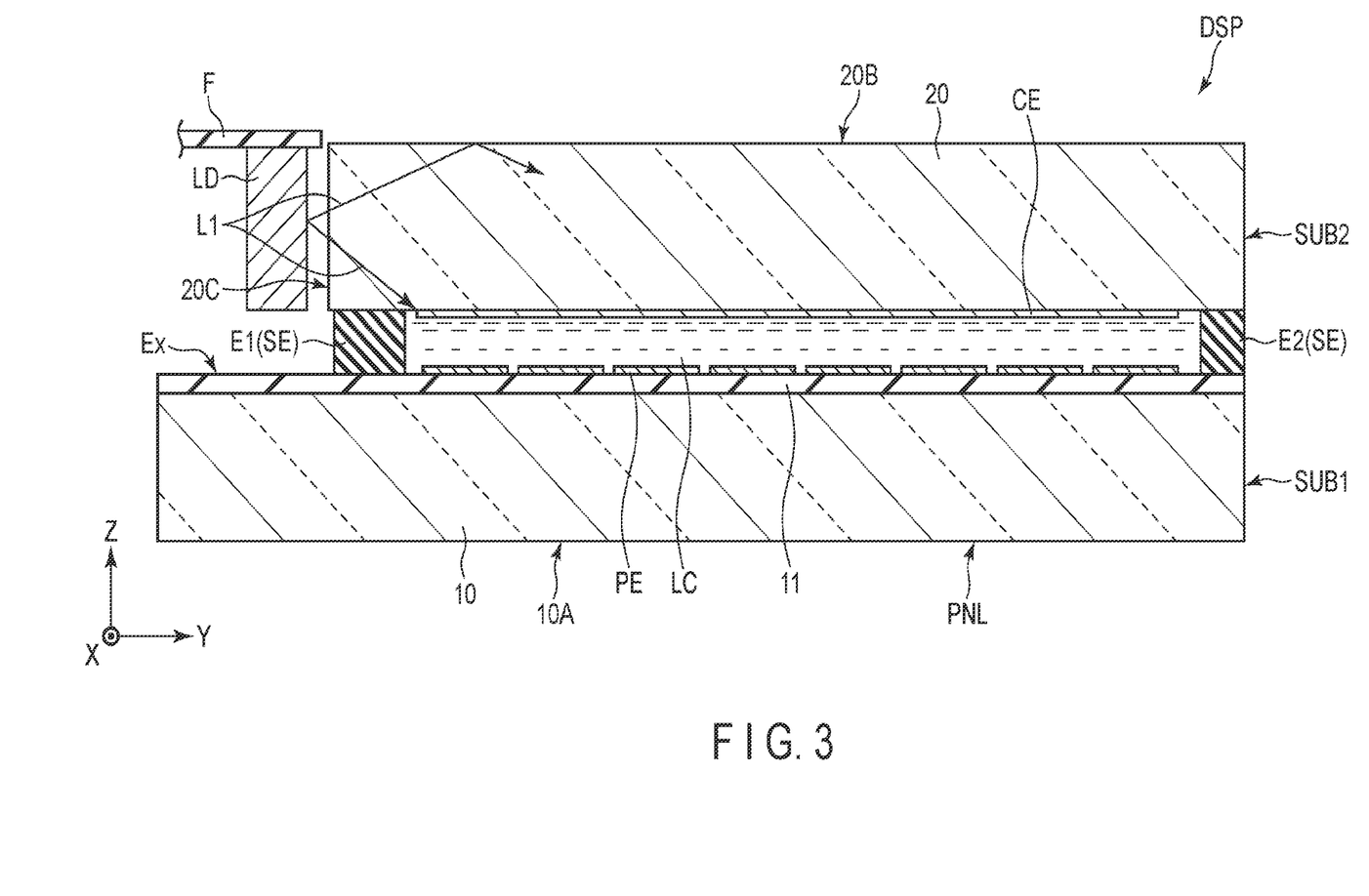
FIG. 3 is a cross-sectional view showing a configuration example of the display device DSP of the present embodiment.

FIG. 3 is a cross-sectional view showing a configuration example of the display device DSP of the present embodiment. As for the display panel PNL, only the main part thereof is illustrated here.

The light-emitting element LD is opposed to a side surface 20C of the transparent substrate 20 in the second direction Y. The light-emitting element LD is electrically connected to a wiring substrate F. The light-emitting element LD is, for example, a light-emitting diode, and although not described in detail, the light-emitting element LD comprises a red light-emitting portion, a green light-emitting portion and a blue light-emitting portion. Note that a transparent lightguide may be disposed between the light-emitting element LD and the side surface 20C.

In the present embodiment, the color of the sealant SE sealing in the liquid crystal layer LC is black, yellow or red. The sealant SE is formed by, for example, mixing an ultraviolet curable resin with a colored filler. As the colored filler, for example, a black filler containing carbon black, titanium black or the like, a colored filler colored in yellow or red, or the like can be applied. Furthermore, the sealant SE may contain fillers colored in two or more different colors. For example, the sealant SE may be formed by mixing a black filler and a red filler. Note that another filler such as silicon dioxide (silica) may be mixed for the purpose of the adjustment of viscosity, the securing of mechanical strength, the reduction of moisture permeability and the like of the sealant SE.

Next, light L1 to be emitted from the light-emitting element LD will be described with reference to FIG. 3.

The light-emitting element LD emits light L1 toward the side surface 20C. The light L1 emitted from the light-emitting element LD travels along the direction of an arrow indicating the second direction Y and enters the transparent substrate 20 from the side surface 20C. The light L1 entering the transparent substrate 20 travels inside the display panel PNL while being repeatedly reflected. The light L1 entering the liquid crystal layer LC to which no voltage is applied is transmitted through the liquid crystal layer LC almost without being scattered. In addition, the light L1 entering the liquid crystal layer LC to which a voltage is applied is scattered in the liquid crystal layer LC. The display device DSP can be observed from the main surface 10A side as well as from the main surface 20B side. Furthermore, the display device DSP is a so-called transparent display, and the background of the display device DSP can be observed via the display device DSP regardless of whether the display device DSP is observed from the main surface 10A side or from the main surface 20B side.

Incidentally, the light L1 traveling toward the sealant SE is absorbed in the sealant SE. In particular, when the color of the sealant SE is black, most of the wavelength range of visible light of the light L1 traveling toward the sealant SE is absorbed by the sealant SE. In addition, also when the color of the sealant SE is yellow or red, a specific wavelength range of visible light (specifically, visible light on the short wavelength side such as blue) of the light L1 traveling toward the sealant SE is absorbed by the sealant SE. Therefore, undesirable reflection and scattering in the sealant SE can be suppressed, and deterioration of display quality can be suppressed. In addition, it is possible, by adjusting the content percentage of a black, yellow or red filler contained in the sealant SE, to adjust not only the color of the sealant SE but also the viscosity, moisture permeability, mechanical strength and the like of the sealant SE.

Figure 4A:
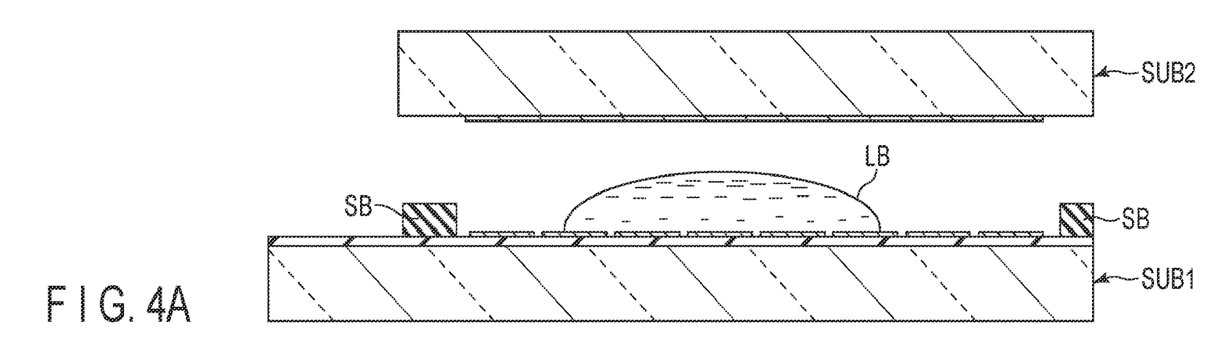
FIG. 4A is an illustration for explaining an example of the manufacturing process of the display panel PNL.
Figure 4B:
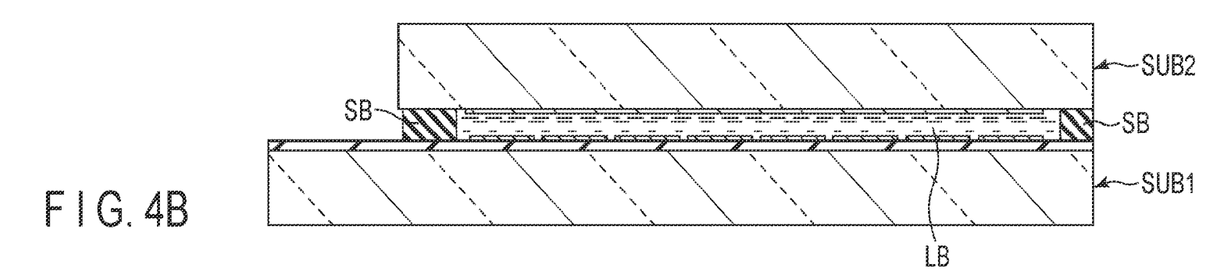
FIG. 4B is an illustration for explaining an example of the manufacturing process of the display panel PNL.
Figure 4C:
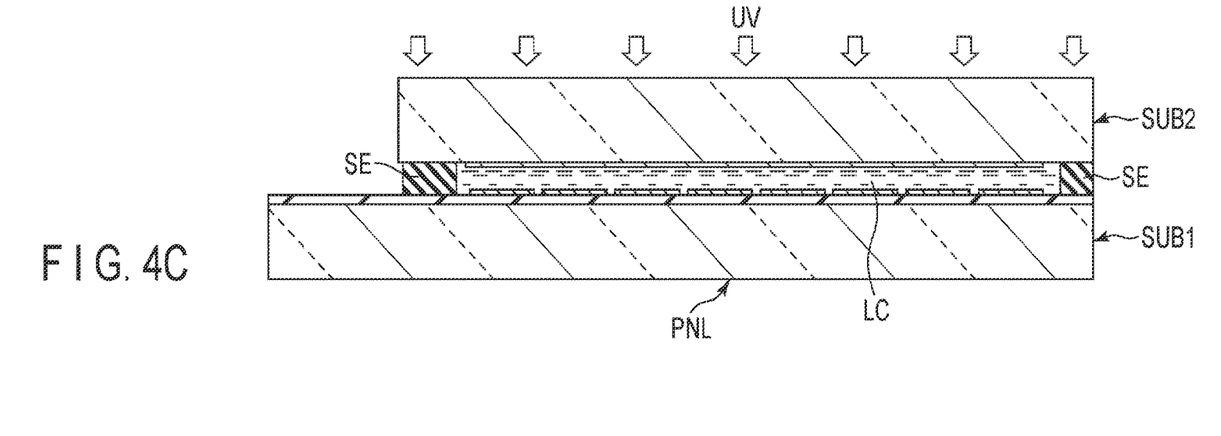
FIG. 4C is an illustration for explaining an example of the manufacturing process of the display panel PNL.

FIGS. 4A to 4C each are an illustration for explaining an example of the manufacturing process of the display panel PNL.

First, as shown in FIG. 4A, a sealant material SB which is the base of the sealant SE is formed in a loop shape on the first substrate SUB1. Then, a liquid crystal material LB which is the base of the liquid crystal layer LC is dropped inside surrounded by the sealant material SB. At a moment when the liquid crystal material LB is dropped, the sealant material SB is in an uncured state. Note that the sealant material SB may be formed in a loop shape on the second substrate SUB2 and the liquid crystal material LB may be dropped onto the second substrate SUB2.

After that, as shown in FIG. 4B, the first substrate SUB1 and the second substrate SUB2 may be bonded together. Accordingly, the liquid crystal material LB spreads over the entire region surrounded by the sealant material SB. The monomer and the liquid crystal molecules contained in the liquid crystal material LB are aligned along the first direction X by the alignment regulating force of the alignment films AL1 and AL2 shown in FIG. 2.

After that, as shown in FIG. 4C, ultraviolet light is radiated toward the sealant material SB and the liquid crystal material LB. The ultraviolet light to be radiated has a peak wavelength around 365 nm to 400 nm, for example. The sealant material SB is cured absorbing the radiated ultraviolet light, and forms the sealant SE. Accordingly, the first substrate SUB1 and the second substrate SUB2 are bonded together. The monomer contained in the liquid crystal material LB is polymerized absorbing the radiated ultraviolet light, and forms a streak-shaped polymer extending along the first direction X. The liquid crystal molecules contained in the liquid crystal material LB are dispersed in the gaps of the polymer in a state of being aligned along the first direction X. Accordingly, the liquid crystal layer LC sealed in by the sealant SE is formed.

The ultraviolet light radiated to the sealant material SB is mostly absorbed in the sealant material SB. Therefore, in a region of the liquid crystal material LB which is close to the sealant material SB, the growth abnormality of the polymer due to the undesirable reflection and scattering of ultraviolet light in the sealant material SB can be suppressed. Therefore, the polymer can be made uniform in almost the entire region of the liquid crystal layer LC, and deterioration of display quality can be suppressed.

Figure 5:
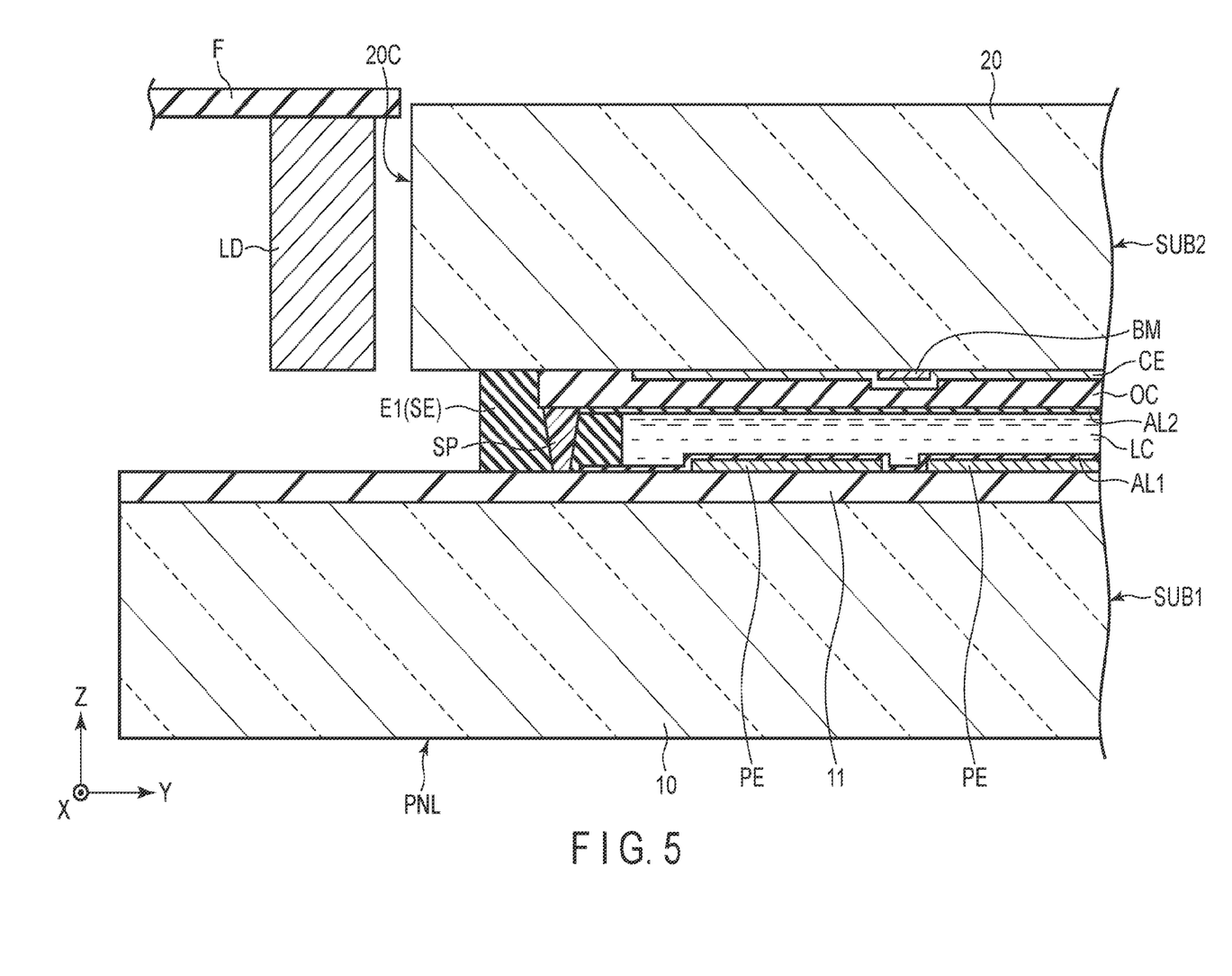
FIG. 5 is a cross-sectional view showing a configuration example in which a region including a portion E1 of a sealant SE is enlarged.

FIG. 5 is a cross-sectional view showing a configuration example in which a region including the portion E1 of the sealant SE is enlarged. The second substrate SUB2 comprises a spacer SP. The spacer SP is formed of, for example, transparent resin, and is disposed on the overcoat layer OC. The spacer SP is in contact with the first substrate SUB1, and forms a predetermined cell gap between the first substrate SUB1 and the second substrate SUB2. The sealant SE surrounds the spacer SP, and is in contact with the alignment films AL1 and AL2 on the side adjacent to the liquid crystal layer LC.

Figure 6:
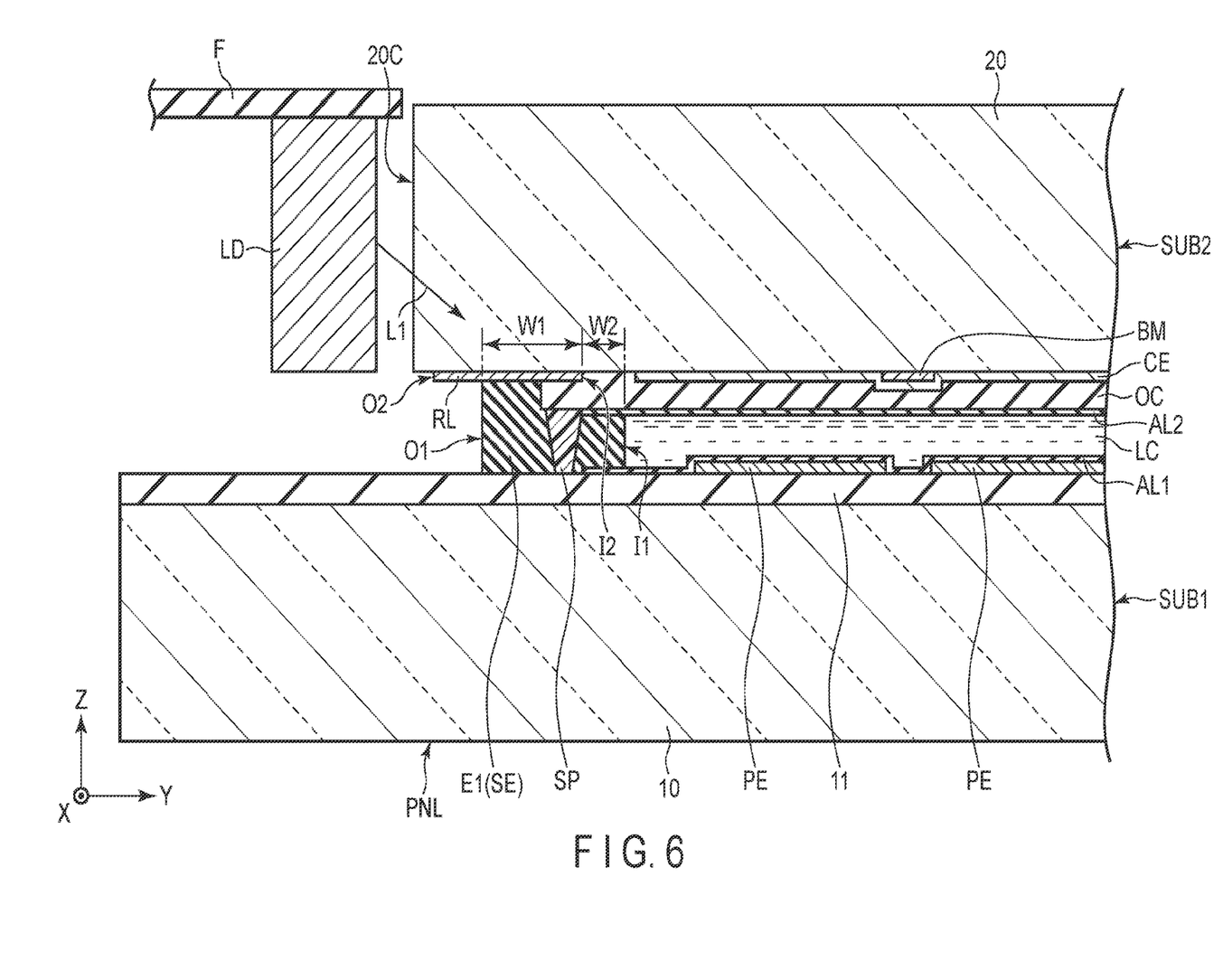
FIG. 6 is a cross-sectional view showing another configuration example in which the region including the portion E1 of the sealant SE is enlarged.

FIG. 6 is a cross-sectional view showing another configuration example in which the region including the portion E1 of the sealant SE is enlarged. The configuration example shown in FIG. 6 is different from the configuration example shown in FIG. 5 in that the second substrate SUB2 comprises a reflective layer RL. The reflective layer RL is located between the transparent substrate 20 and the portion E1 of the sealant SE. This reflective layer RL is formed of, for example, the same material as the light-shielding layer BM. For example, as described with reference to FIG. 2, the reflective layer RL is formed of a non-transparent metal material such as molybdenum, aluminum, tungsten, titanium or silver.

The reflective layer RL and the light-shielding layer BM are in contact with the transparent substrate 20. The common electrode CE covers the light-shielding layer BM and is in contact with the transparent substrate 20. Note that the common electrode CE may be apart from the reflective layer RL.

Accordingly, the light L1 traveling from the light-emitting element LD toward the sealant SE is reflected by the reflective layer RL without being absorbed in the portion E1 of the sealant SE. Therefore, the use efficiency of light can be improved. In addition, when the reflective layer RL is disposed, the reflective layer RL is formed in the same process as the light-shielding layer BM, and the number of manufacturing processes will not be increased.

Figure 7:
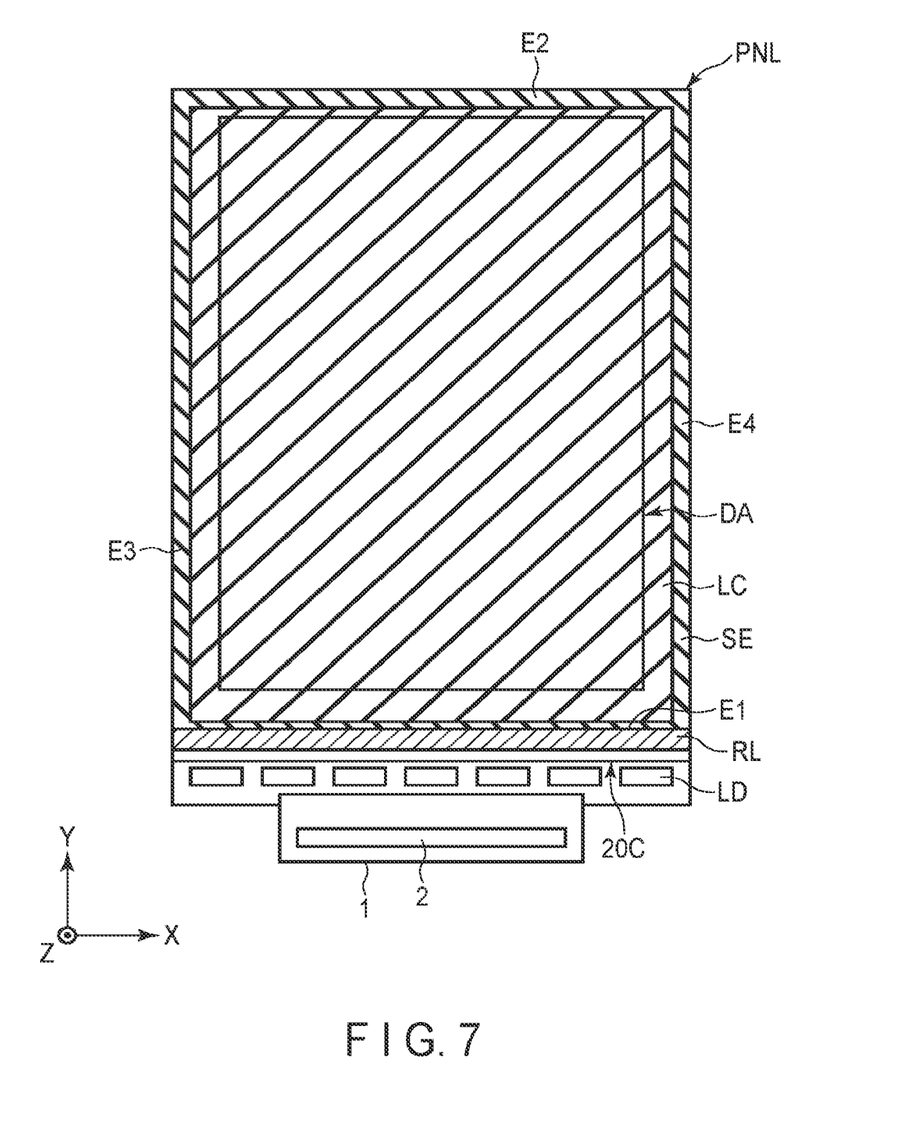
FIG. 7 is a plan view of the display panel PNL comprising a reflective layer RL shown in FIG. 6.

FIG. 7 is a plan view of the display panel PNL comprising the reflective layer RL shown in FIG. 6. The reflective layer RL extends along the first direction X, and overlaps the portion E1 of the sealant SE and does not overlap the other portions E2 to E4. In addition, the reflective layer RL is disposed between each of the light-emitting elements LD arranged in the first direction X and the display portion DA. Therefore, light from any of the light-emitting elements LD can be reflected by the reflective layer RL.

The description continues with reference to FIG. 6 again. The sealant SE comprises an inner end portion I1 being in contact with the liquid crystal layer LC and an outer end portion O1 located on the opposite side to the inner end portion I1. The reflective layer RL comprises an inner end portion I2 and an outer end portion O2. The inner end portion I2 is located between the outer end portion O1 and the inner end portion I1 along the second direction Y. That is, the inner end portion I2 overlaps the sealant SE along the third direction Z. The outer end portion O2 is located between the side surface 20C of the transparent substrate 20 and the outer end portion O1 along the second direction Y. That is, the outer end portion O2 does not overlap the sealant SE. The outer end portion O2 may overlap the side surface 20C.

In the portion E1 of the sealant SE, a width W1 along the second direction Y from the outer end portion O1 to the inner end portion I2 is greater than a width W2 along the second direction Y from the inner end portion I2 to the inner end portion I1. When the sum of the widths W1 and W2 which is the total width of the end portion E1 is 500 to 800 μm, the width W2 is preferably greater than or equal to 50 μm.

As described with reference to FIGS. 4A to 4C, when ultraviolet light is radiated to the sealant material SB, if the entire sealant material SB is covered with the reflective layer RL, sufficient ultraviolet light will not be radiated to the sealant material SB, and the curing of the sealant material SB will be inhibited. In particular, when a part of the sealant material SB which is in contact with the liquid crystal layer LC is uncured, impurities will seep from the sealant material SB into the liquid crystal material LB, and display quality will be adversely affected.

In the configuration example shown in FIG. 6, the reflective layer RL does not overlap the region of the sealant SE which is located on the side adjacent to the liquid crystal layer LC. Therefore, in the manufacturing process of the display panel PNL, sufficient ultraviolet light is radiated to the part of the sealant material SB which is in contact with the liquid crystal material LB, and the sealant material SB is cured. Therefore, the seepage of impurities from the sealant material SB into the liquid crystal material LB can be suppressed.

Figure 8:
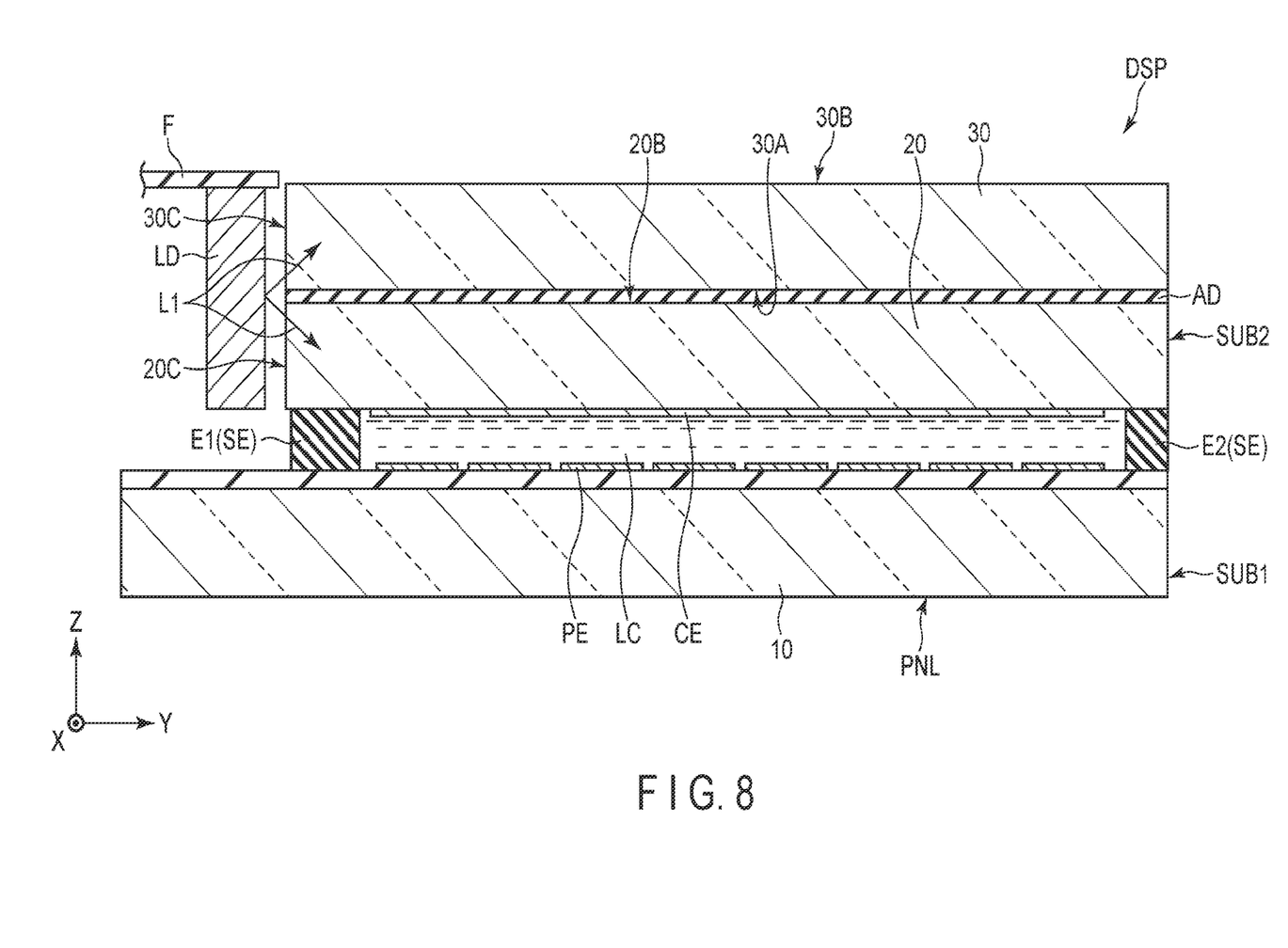
FIG. 8 is a cross-sectional view showing another configuration example of the display device DSP of the present embodiment.

FIG. 8 is a cross-sectional view showing another configuration example of the display device DSP of the present embodiment. The configuration example shown in FIG. 8 is different from the configuration example shown in FIG. 3 in that the display device DSP comprises a transparent substrate 30 bonded to the transparent substrate 20. The transparent substrate 20 is located between the liquid crystal layer LC and the transparent substrate 30 along the third direction Z. The transparent substrate 30 is an insulating substrate such as a glass substrate or a plastic substrate, and has an equal refractive index to the transparent substrates 10 and 20. The transparent substrate 30 comprises a main surface (lower surface) 30A, a main surface (upper surface) 30B on the opposite side to the main surface 30A, and a side surface 30C. The transparent adhesive layer AD is interposed between the main surface 20B of the transparent substrate 20 and the main surface 30A of the transparent substrate 30. The adhesive layer AD has an equal refractive index to the transparent substrates 20 and 30. Note that being equal here is not limited to when the refractive index difference is zero but also includes when the refractive index difference is less than or equal to 0.03. The light-emitting element LD is opposed to the side surface 20C of the transparent substrate 20 and the side surface 30C of the transparent substrate 30 along the second direction Y.

In this configuration example, the light L1 emitted from the light-emitting element LD enters the display panel PNL from the side surfaces 20C and 30C.

Also in this configuration example, the same effects as those obtained in the above-described configuration example can be obtained. As for the structure of the region including the portion E1 of the sealant SE, either of the configuration example shown in FIG. 5 and the configuration example shown in FIG. 6 can be applied.

Figure 9:
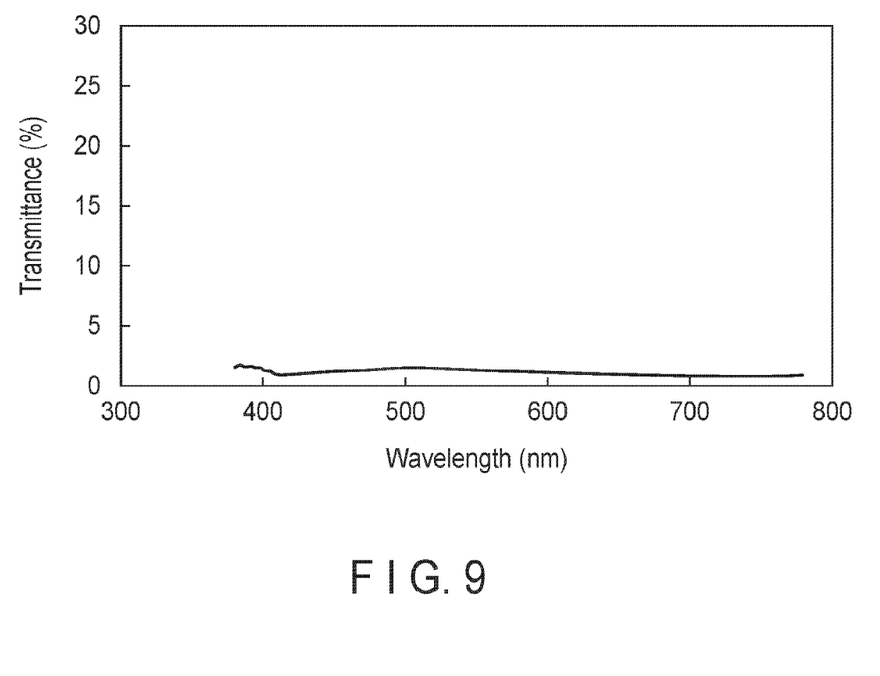
FIG. 9 is an illustration showing the spectral transmittance of the sealant SE applied to the present embodiment.

FIG. 9 is an illustration showing the spectral transmittance of the sealant SE applied to the present embodiment. The horizontal axis shows the wavelength, and the vertical axis shows the transmittance. The transmittance here is a transmittance measured in the portion E2 of the black sealant SE, and the sealant SE at the measurement location does not overlap non-transparent conductive layers such as a wiring line and a circuit. The spectral transmittance of the sealant SE is less than or equal to 10% at least in a wavelength range of greater than or equal to 380 nm but less than or equal to 780 nm. In the illustrated example, the spectral transmittance in this wavelength range is almost 0%. As for the yellow or red sealant SE applicable to the present embodiment, the spectral transmittance at least in the wavelength of greater than or equal to 380 nm but less than or equal to 780 nm is less than 10% similarly.

As described above, this sealant SE is formed by absorbing almost without transmitting ultraviolet light radiated to the sealant material SB in the manufacturing process of the display panel PNL. The spectral transmittance of the uncured sealant material SB and the spectral transmittance of the cured sealant SE depend on the spectral transmittance of the filler contained therein. The filler does not change in quality before and after the radiation of ultraviolet light, and the spectral transmittance almost does not change accordingly. Therefore, the description here will be based on the assumption that the spectral transmittance of the sealant SE and the spectral transmittance of the sealant material SB are almost identical to each other.

According to the sealant SE having the above-descried spectral transmittance, it is found that the transmittance of ultraviolet light (having a peak wavelength around 365 nm to 400 nm) radiated toward the sealant material SB in the manufacturing process is almost 0%. That is, almost no ultraviolet light is transmitted through the sealant material SB (or scattered in the sealant material SB) or reaches the liquid crystal material LB. Therefore, the growth abnormality of the polymer of the liquid crystal material LB can be suppressed in the region close to the sealant material SB. In addition, the deterioration of display quality due to the growth abnormality of the polymer can be suppressed.

In the present embodiment, the transparent substrate 10 corresponds to the first transparent substrate, the transparent substrate 20 corresponds to the second transparent substrate, the transparent substrate 30 corresponds to the third transparent substrate, the inner end portion I1 corresponds to the first inner end portion, the outer end portion O1 corresponds to the first outer end portion, the inner end portion I1 corresponds to the second inner end portion, the outer end portion O2 corresponds to the second outer end portion, the width W1 corresponds to the first width, and the width W2 corresponds to the second width.

As described above, according to the present embodiment, a display device capable of suppressing deterioration of display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configuration disposed in the specification will be appended below.

(1)
A display device comprising:
a first substrate comprising a first transparent substrate and a pixel electrode;
a second substrate comprising a second transparent substrate and a common electrode opposed to the pixel electrode;
a liquid crystal layer located between the first substrate and the second substrate, and containing a polymer and liquid crystal molecules;
a sealant bonding the first substrate and the second substrate, and sealing in the liquid crystal layer; and
a light-emitting element, wherein the second transparent substrate comprises a side surface opposed to the light-emitting element, and
a color of the sealant is black, yellow or red.

(2)
The display device of item (1), wherein
the second substrate comprises a reflective layer, and
the reflective layer is located between the second transparent substrate and the sealant.

(3)
The display device of item (2), wherein
the sealant comprises a first inner end portion being in contact with the liquid crystal layer and a first outer end portion located on an opposite side to the first inner end portion, and
the reflective layer comprises a second inner end portion located between the first inner end portion and the first outer end portion.

(4)
The display device of item (3), wherein the reflective layer comprises a second outer end portion located between the side surface of the second transparent substrate and the first outer end portion.

(5)
The display device of any one of items (3) and (4), wherein in the sealant, a first width from the first outer end portion to the second inner end portion is greater than a second width from the second inner end portion to the first inner end portion.

(6)
The display device of item (5), wherein the second width is greater than or equal to 50 μm.

(7)
The display device of any one of items (2) to (6), wherein
the second substrate comprises a light-shielding layer located between the second transparent substrate and the liquid crystal layer, and
the reflective layer is formed of a same material as the light-shielding layer.

(8)
The display device of item (7), wherein the light-shielding layer comprises a conductive layer having a lower resistance than the common electrode, and is electrically connected to the common electrode.

(9)
The display device of any one of items (1) to (8), further comprising a third transparent substrate bonded to the second transparent substrate, wherein
the second transparent substrate is located between the liquid crystal layer and the third transparent substrate, and
the third transparent substrate comprises a side surface opposed to the light-emitting element.

(10)
The display device of any one of items (1) to (9), wherein a spectral transmittance of the sealant is less than or equal to 10% in a wavelength length of greater than or equal to 380 nm but less than or equal to 780 nm.

(11)
The display device of any one of items (1) to (10), wherein
the sealant has an ultraviolet curable resin and a filler, and
the filler includes at least one of a black filler containing carbon black or titanium black and a colored filler colored in yellow or red.

(12)
A display device comprising:
a first substrate comprising a first transparent substrate and a pixel electrode;
a second substrate comprising a second transparent substrate and a common electrode opposed to the pixel electrode;
a liquid crystal layer located between the first substrate and the second substrate, and containing a polymer and liquid crystal molecules;
a sealant bonding the first substrate and the second substrate, and sealing in the liquid crystal layer; and
a light-emitting element, wherein
the second transparent substrate comprises a side surface opposed to the light-emitting element, and
the sealant contains a colored filler colored in at least one of black, yellow and red.

(13)
The display device of item (12), wherein
the sealant further has a ultraviolet curable resin, and
the colored filler is a black filler containing carbon black or titanium black or a colored filler colored in yellow or red.

(14)
The display device of item (2), comprising a plurality of the light-emitting elements arranged in a first direction, wherein
the reflective layer extends along the first direction in planar view.

(15)
The display device of item (14), wherein the polymer extends along the first direction.

(16)
The display device of item (14), wherein
the sealant has a first portion and a second portion extending along the first direction, and a third portion and a fourth portion extending along a second direction intersecting the first direction,
the first portion is located between the light-emitting elements and the second portion, and
the reflective layer overlaps the first portion and does not overlap the second portion, the third portion and the fourth portion.

(17)
The display device of item (7), wherein the light-shielding layer and the reflective layer are in contact with the second transparent substrate.

(18)
The display device of item (8), wherein
the light-shielding layer is in contact with the second transparent substrate, and
the common electrode covers the light-shielding layer and is in contact with the second transparent substrate.

(19)
The display device of item (18), wherein the common electrode is apart from the reflective layer.

(20)
The display device of item (9), further comprising a transparent adhesive layer interposed between the second transparent substrate and the third transparent substrate, wherein
the adhesive layer has an equal reflective index to the second transparent substrate and the third transparent substrate.

What is claimed is:
1. A display device comprising:
a first substrate comprising a first transparent substrate and a pixel electrode;
a second substrate comprising a second transparent substrate and a common electrode opposed to the pixel electrode;
a liquid crystal layer located between the first substrate and the second substrate, and containing a polymer and liquid crystal molecules;
a sealant bonding the first substrate and the second substrate; and sealing the liquid crystal layer; and
a plurality of light-emitting elements arranged in a first direction, wherein
the second transparent substrate comprises a side surface opposed to the light-emitting elements,
a color of the sealant is black, yellow or red,
the second substrate comprises a reflective layer,
the reflective layer is located between the second transparent substrate and the sealant,
the reflective layer extends along the first direction in planar view,
the sealant includes a first portion and a second portion extending along the first direction, and a third portion and a fourth portion extending along a second direction intersecting the first direction,
the first portion is located between the light-emitting elements and the second portion, and
the reflective layer overlaps the first portion and does not overlap the second portion, the third portion, and the fourth portion.

2. The display device of claim 1, wherein
the sealant comprises a first inner end portion being in contact with the liquid crystal layer and a first outer end portion located on an opposite side to the first inner end portion, and
the reflective layer comprises a second inner end portion located between the first inner end portion and the first outer end portion.

3. The display device of claim 2, wherein the reflective layer comprises a second outer end portion located between the side surface of the second transparent substrate and the first outer end portion.

4. The display device of claim 2, wherein in the sealant, a first width from the first outer end portion to the second inner end portion is greater than a second width from the second inner end portion to the first inner end portion.

5. The display device of claim 4, wherein the second width is greater than or equal to 50 μm.

6. The display device of claim 1, wherein
the second substrate comprises a light-shielding layer located between the second transparent substrate and the liquid crystal layer, and
the reflective layer is formed of a same material as the light-shielding layer.

7. The display device of claim 6, wherein the light-shielding layer comprises a conductive layer having a lower resistance than the common electrode, and is electrically connected to the common electrode.

8. The display device of claim 7, wherein
the light-shielding layer is in contact with the second transparent substrate, and
the common electrode covers the light-shielding layer and is in contact with the second transparent substrate.

9. The display device of claim 8, wherein the common electrode is apart from the reflective layer.

10. The display device of claim 6, wherein the light-shielding layer and the reflective layer are in contact with the second transparent substrate.

11. The display device of claim 1, further comprising a third transparent substrate bonded to the second transparent substrate, wherein
the second transparent substrate is located between the liquid crystal layer and the third transparent substrate, and
the third transparent substrate comprises a side surface opposed to the light-emitting elements.

12. The display device of claim 11, further comprising a transparent adhesive layer interposed between the second transparent substrate and the third transparent substrate, wherein
the adhesive layer has an equal reflective index to the second transparent substrate and the third transparent substrate.

13. The display device of claim 1, wherein a spectral transmittance of the sealant is less than or equal to 10% in a wavelength length of greater than or equal to 380 nm but less than or equal to 780 nm.

14. The display device of claim 1, wherein
the sealant has an ultraviolet curable resin and a filler, and
the filler includes at least one of a black filler containing carbon black or titanium black and a colored filler colored in yellow or red.

15. The display device of claim 1, wherein the polymer extends along the first direction.

16. A display device comprising:
a first substrate comprising a first transparent substrate and a pixel electrode;
a second substrate comprising a second transparent substrate and a common electrode opposed to the pixel electrode;
a liquid crystal layer located between the first substrate and the second substrate, and containing a polymer and liquid crystal molecules;
a sealant bonding the first substrate and the second substrate, and sealing the liquid crystal layer; and
a light-emitting element, wherein
the second transparent substrate comprises a side surface opposed to the light-emitting element,
a color of the sealant is black, yellow or red,
the second substrate comprises a reflective layer,
the reflective layer is located between the second transparent substrate and the sealant,
the second substrate comprises a light-shielding layer located between the second transparent substrate and the liquid crystal layer,
the reflective layer is formed of a same material as the light-shielding layer,
the light-shielding layer comprises a conductive layer having a lower resistance than the common electrode, and is electrically connected to the common electrode,
the light-shielding layer is in contact with the second transparent substrate,
the common electrode covers the light-shielding layer and is in contact with the second transparent substrate, and
the common electrode is apart from the reflective layer.

17. The display device of claim 16, wherein
the sealant comprises a first inner end portion being in contact with the liquid crystal layer and a first outer end portion located on an opposite side to the first inner end portion, and
the reflective layer comprises a second inner end portion located between the first inner end portion and the first outer end portion.

18. The display device of claim 16, wherein the light-shielding layer and the reflective layer are in contact with the second transparent substrate.

19. The display device of claim 16, further comprising a third transparent substrate bonded to the second transparent substrate, wherein
the second transparent substrate is located between the liquid crystal layer and the third transparent substrate, and
the third transparent substrate comprises a side surface opposed to the light-emitting element.

20. The display device of claim 16, wherein
the sealant has an ultraviolet curable resin and a filler, and
the filler includes at least one of a black filler containing carbon black or titanium black and a colored filler colored in yellow or red.

* * * * *